(12) United States Patent
Tomikawa et al.

(10) Patent No.: US 6,950,102 B2
(45) Date of Patent: Sep. 27, 2005

(54) GRAPHICS DRAWING APPARATUS AND METHOD

(75) Inventors: Hideaki Tomikawa, Tokyo (JP); Junichi Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 10/330,952

(22) Filed: Dec. 27, 2002

(65) Prior Publication Data

US 2003/0169266 A1 Sep. 11, 2003

(30) Foreign Application Priority Data

Dec. 28, 2001 (JP) ........................................ 2002-401074

(51) Int. Cl.$^7$ ............................ G06F 13/36; G09G 5/36; G06T 11/00; G06T 15/00
(52) U.S. Cl. ........................................ 345/441; 345/522
(58) Field of Search ............................... 345/441–443, 345/501, 522, 520

(56) References Cited

U.S. PATENT DOCUMENTS

| | | | | |
|---|---|---|---|---|
| 4,658,247 A | * | 4/1987 | Gharachorloo | 345/441 |
| 4,758,965 A | * | 7/1988 | Liang et al. | 345/441 |
| 5,408,605 A | * | 4/1995 | Deering | 345/501 |
| 5,999,200 A | * | 12/1999 | Harkin et al. | 345/522 |

* cited by examiner

Primary Examiner—Jeffery A. Brier
(74) Attorney, Agent, or Firm—Frommer Lawrence & Haug LLP; William S. Frommer; Thomas F. Presson

(57) ABSTRACT

A graphics drawing apparatus able to reduce the amount of data transferred, able to realize a lower power consumption, and consequently able to achieve an improvement of performance of the system as a whole, provided with address generator for automatically generating addresses of drawing parameter registers required for the drawing in a defined sequence of drawing parameters according to address data and a specified drawing type; a register address selector for selecting either of the address data for specifying the register addresses of the address generator transferred through a general purpose bus or the address data for specifying the register address of the address generator by a former engine and inputting the same to the address generator; and a drawing data selector for selecting either of the drawing parameter data transferred through the general purpose bus or the drawing parameter data from the former engine and inputting the same to the drawing engine, and a method of the same.

5 Claims, 14 Drawing Sheets

| DRAWING TYPE | DRAWING PARAMETERS |
|---|---|
| COLOR | R, G, B, A, X, Y, Z |
| COLOR + FOG | R, G, B, A, X, Y, Z, F |
| TEXTURE MAPPING (STQ) | S, T, Q, X, Y, Z |
| ⋮ | ⋮ |
| COLOR + T/M (STQ) | S, T, Q, R, G, B, A, X, Y, Z |

FIG. 6
(RELATED ART)

| ADDRESS (7 BIT) | DATA (32 BIT) |
|---|---|
| r1 | R1 |
| g1 | G1 |
| b1 | B1 |
| a1 | A1 |
| x1 | X1 |
| y1 | Y1 |
| z1 | Z1 |
| r2 | R2 |
| g2 | G2 |
| b2 | B2 |
| a2 | A2 |
| x2 | X2 |
| y2 | Y2 |
| z2 | Z2 |
| r3 | R3 |
| g3 | G3 |
| b3 | B3 |
| a3 | A3 |
| x3 | X3 |
| y3 | Y3 |
| z3 | Z3 |

VERTEX 1: r1–z1
VERTEX 2: r2–z2
VERTEX 3: r3–z3

TIME ↓

FIG. 9

| DRAWING TYPE | DRAWING PARAMETER REGISTER SETTING SEQUENCE | DRAWING PARAMETER REGISTER ADDRESS GENERATION SEQUENCE |
|---|---|---|
| COLOR | R→G→B→A→X→Y→Z | r→g→b→a→x→y→z |
| COLOR + FOG | R→G→B→A→X→Y→Z→F | r→g→b→a→x→y→z→f |
| TEXTURE MAPPING (STQ) | S→T→Q→X→Y→Z | s→t→q→x→y→z |

| COLOR + T/M (STQ) | S→T→Q→R→G→B→A→X→Y→Z | s→t→q→r→g→b→a→x→y→z |
|---|---|---|

FIG. 11

| DRAWING PARAMETER | FUNCTION |
|---|---|
| COLOR INFORMATION (C) | SPECIFIES COLOR INFORMATION OF EACH VERTEX OF PRIMITIVE. COLOR INFORMATION IN PRIMITIVE IS GENERALLY LINEARLY INTERPOLATED (GLOW SHADING) USING SPECIFIED VERTEX COLORS OR PAINTED BY ONE CERTAIN COLOR (FLAT SHADING). |
| FOG INFORMATION (F) | SPECIFIES FOG INFORMATION OF EACH VERTEX OF PRIMITIVE. FOG INFORMATION IN PRIMITIVE IS GENERALLY LINEARLY INTERPOLATED (GLOW SHADING) USING SPECIFIED FOG VALUE OR REPRESENTED BY ONE CERTAIN COLOR (FLAT SHADING) |
| TEXTURE INFORMATION (S) | SPECIFIES TEXTURE COORDINATE OF EACH VERTEX OF PRIMITIVE. TEXTURE COORDINATES IN PRIMITIVE ARE GENERALLY LINEARLY INTERPOLATED (GLOW SHADING) |
| VERTEX COORDINATE (V) | SPECIFIES GEOMETRIC COORDINATE OF EACH VERTEX OF PRIMITIVE. TEXTURE COORDINATES IN PRIMITIVE ARE LINEARLY INTERPOLATED. |
| TEXEL INFORMATION (U) | SPECIFIES TEXEL COORDINATE OF EACH VERTEX OF PRIMITIVE. TEXEL COORDINATES IN PRIMITIVE ARE GENERALLY LINEARLY INTERPOLATED (GLOW SHADING). |

FIG. 12

| DRAWING TYPE | EXPLANATION |
| --- | --- |
| CV | IN ADDITION TO VERTEX COORDINATES, SPECIFIES COLOR INFORMATION OF PRIMITIVE. MINIMUM ATTRIBUTE INFORMATION WHEN DRAWING PRIMITIVE. |
| CFV | IN ADDITION TO COLOR INFORMATION, FOG EFFECT (OVERALL WHITENING EFFECT) IS ADDED. |
| SV | SPECIFIES TEXTURE COORDINATE IN ADDITION TO VERTEX COORDINATE. ADHERES PART OF TEXTURE IMAGE TO PRIMITIVE. |
| SCV | WHEN DRAWING SINGLE PRIMITIVE, ADHESION OF TEXTURE IMAGE AND COLOR GENERATION ARE SUPERIMPOSED. SUPERIMPOSITION BY CERTAIN MIXING RATE. |
| SFV | IN ADDITION TO TEXTURE INFORMATION, FOG EFFECT (OVERALL WHITENING EFFECT) IS ADDED. |
| SCFV | IN ADDITION TO EFFECT OF SCV, FOG EFFECT (OVERALL WHITENING EFFECT) IS ADDED. |
| SSV | TWO TEXTURE IMAGES SUPERIMPOSED ON ONE PRIMITIVE (MULTI-TEXTURE FUNCTION). EFFECT EQUIVALENT TO THAT BY SCV OBTAINED, BUT IMAGE FURTHER SUPERIMPOSED ON TEXTURE IS TEXTURE, SO EXPRESSION MORE COMPLEX THAN SCV BECOMES POSSIBLE. |
| SSCV | IN ADDITION TO DRAWING OF SSV, COLOR DRAWING IS FURTHER ADDED. ADDITION OF SHADING PROCESSING ETC. FEASIBLE. |
| SSFV | IN ADDITION TO DRAWING OF SSV, FOG EFFECT (OVERALL WHITENING EFFECT) IS ADDED. |
| SSCFV | IN ADDITION TO DRAWING OF SSCV, FOG EFFECT (OVERALL WHITENING EFFECT) IS ADDED. |

FIG. 13A   FIG. 13B   FIG. 13C
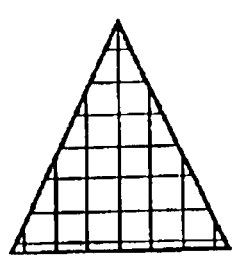 + 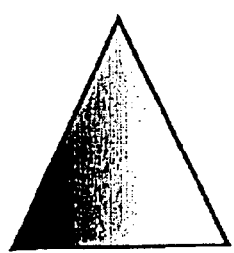 = 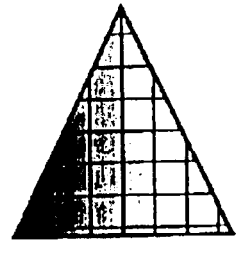
TEXTURE IMAGE
(IMAGE ADHESION)
COLOR IMAGE
(SHADOW
INFORMATION)
DRAWN IMAGE
(SHADED IMAGE)
FIG. 14A   FIG. 14B   FIG. 14C
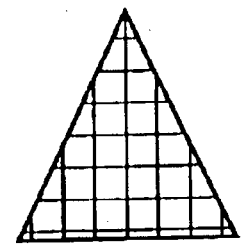 + 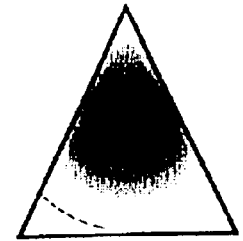 = 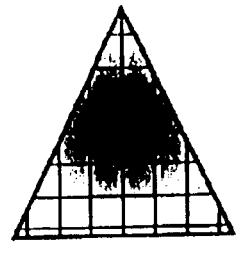
TEXTURE MAP
(IMAGE ADHESION)
TEXTURE IMAGE
(REFLECTION
INFORMATION
ETC.)
DRAWN IMAGE
(IMAGE WITH
REFLECTION ETC.)

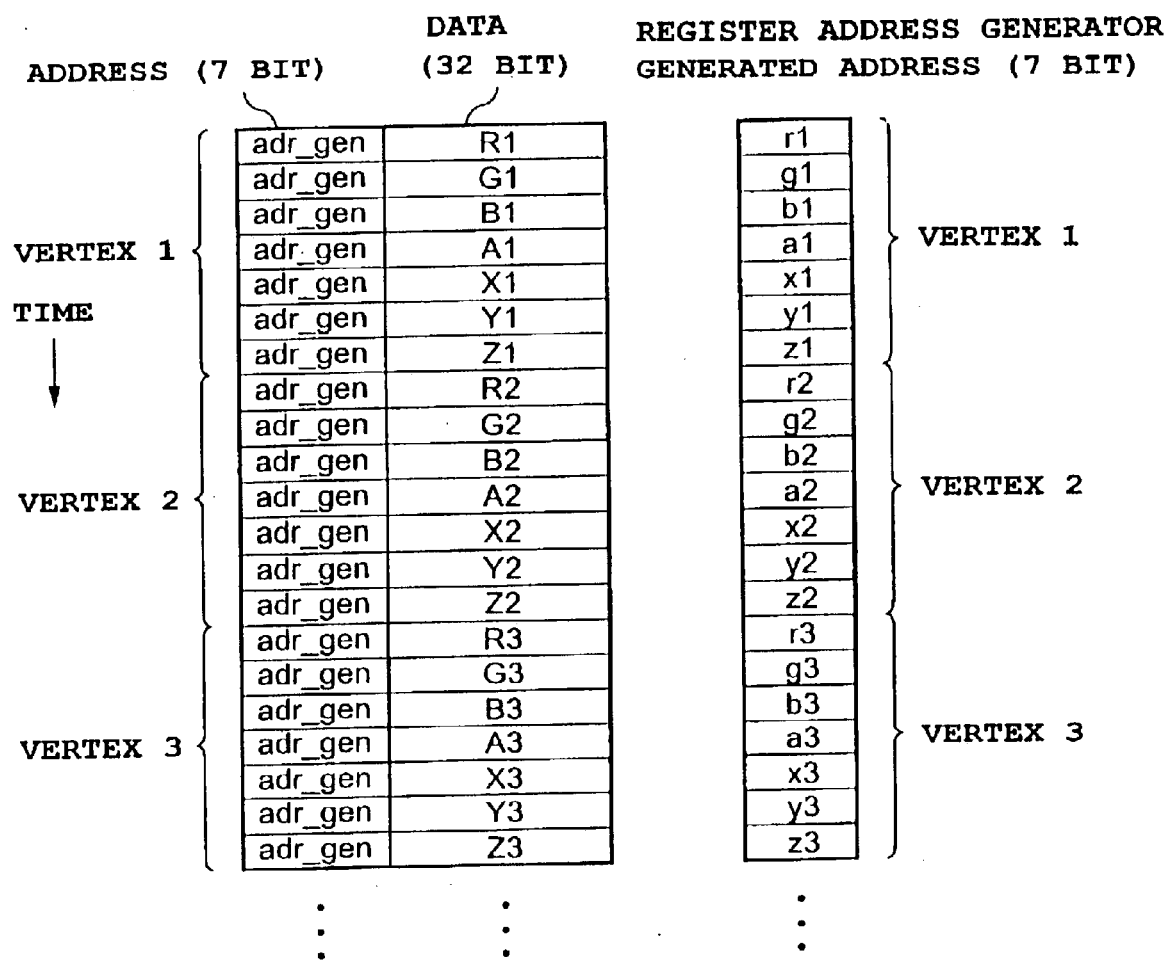

GRAPHICS DRAWING APPARATUS AND METHOD

BACKGROUND OF THE INVENTION

1. Field of the Invention

The present invention relates to a graphics drawing apparatus provided with a register address generating device for automatically generating drawing parameter register addresses required for the drawing according to type and a method of the same.

2. Description of the Related Art

A computer graphics drawing engine draws primitives by setting color information, position information, and other drawing parameters of vertexes of triangles, straight lines, or other primitives to be drawn.

FIG. 1 is a view of an example of a drawing primitive and drawing parameters when drawing a triangular primitive.

As shown in FIG. 1, the drawing parameters of each vertex of the triangular primitive include color information, depth information, and attribute information.

Specifically, the drawing parameters of a vertex 1 include R (red) 1, G (green) 1, B (blue) 1, and $\alpha$ (alpha blend coefficient) 1 as the color information, include Z1 as the depth information, and include F (fog coefficient) 1 etc. as the attribute information.

Similarly, the drawing parameters of a vertex 2 include R2, G2, B2, and $\alpha$2 as the color information, include Z2 as the depth information, and include F2 etc. as the attribute information.

The drawing parameters of a vertex 3 include R3, G3, B3, and $\alpha$3 as the color information, include Z3 as the depth information, and include F3 etc. as the attribute information.

Usually, the drawing parameters of each vertex are set from a former geometric operation engine, CPU, etc. (hereinafter referred to as a "former engine") for coordinate conversion etc. As shown in FIG. 2, a former engine 1 and a drawing engine 2 are connected by a certain restricted bus size (32-bit size in the example of FIG. 2) in many cases.

As shown in FIG. 3, the former engine 1 has an address generator 11. The drawing engine 2 has, as shown in FIG. 3, drawing parameter registers 21-1 (R1), 21-2 (R2), ..., 21-n (f3) and a decoder 22.

The drawing parameters are set in the drawing parameter registers 21-1 (R1), 21-2 (R2), ..., 21-n (f3) provided inside the drawing engine 2.

The drawing parameters are selected by an address bus 3. Desired data transferred through a data bus 4 is written in the drawing parameter registers 22-1 to 22-n selected by the address bus 3 and decoded by the decoder 22.

The addresses of the drawing parameter registers used are values fixed in advance. Accordingly, the former engine 1 for writing the drawing parameters must generate the addresses of the drawing parameter registers corresponding to the drawing parameters to be written by the address generator 11 and transfer the same to the drawing engine 2.

The data strings given from the former engine 1 to the drawing engine 2 are comprised of addresses and data strings and become as shown in FIG. 4.

Specifically, when writing the drawing parameter R1 (color information) into the drawing parameter register 21-1, the data string becomes a data string comprised of the 7-bit address r1 generated at the address generator 11 and 32-bit drawing parameter R1.

When writing the drawing parameter G1 (color information) into the drawing parameter register 21-2, the data string becomes a data string comprised of the 7-bit address g1 generated at the address generator 11 and the 32-bit drawing parameter G1.

When writing the drawing parameter F3 (fog coefficient) into the drawing parameter register 21-n, the data string becomes a data string comprised of the 7-bit address f3 generated at the address generator 11 and the 32-bit drawing parameter F3.

The drawing parameters which must be set in the drawing engine 2 are determined, as shown in FIG. 5, according to the drawing type such as texture mapping, fog blending, and alpha blending.

Once the drawing type is determined, the drawing type is rarely changed until a certain set amount of primitives finishes being generated. In the address generator 11, as shown in FIG. 6, a certain fixed address is repeatedly set during that time.

Summarizing the problem to be solved by the invention, a configuration where data is directly written into the drawing parameter registers 21-1 to 21-n of the drawing engine 2 is from a memory storing in advance the drawing parameters to be written via a direct memory access (DMA) controller may also be considered.

In this case, the DMA controller has to add the addresses of the corresponding drawing parameter registers to the data in accordance with the drawing parameters to be written into the drawing engine 2.

The addresses to be added are comprised of about 7 bits, but in general DMA transfer, DMA packets are generated with the bit size of the data boundary of the memory, for example, 32 bits. Therefore, as shown in FIG. 7, the data size of the DMA packets becomes twice that of the drawing parameters to be transferred.

Namely, in the transfer of data by DMA transfer, the amount of the data transferred becomes a bottleneck of performance in many cases.

SUMMARY OF THE INVENTION

An object of the present invention is to provide a graphics drawing apparatus able to reduce the amount of data transfered, able to realize a lower power consumption, and in turn able to achieve an improvement of performance of the system as a whole and a method of the same.

To attain the above object, according to a first aspect of the present invention, there is provided a graphics drawing apparatus for drawing graphic data in a memory, comprising a drawing engine having a plurality of drawing parameter registers corresponding to the drawing parameters, receiving specified drawing parameter register addresses and drawing parameter data, setting the drawing parameters corresponding to the address-specified drawing parameter registers, and drawing for the memory based on the set drawing parameters; a former engine for receiving at least data concerning the drawing type and outputting the drawing parameters to the drawing engine in the sequence to be transferred defined in advance in accordance with the drawing type; and an address generator for generating the drawing parameter register addresses of the drawing engine in the sequence of the drawing parameters to be transferred defined in advance in accordance with the drawing type and outputting the generated drawing parameter register addresses to the drawing engine.

In the first aspect of the present invention, preferably the address generator generates the drawing parameter register addresses based on the specified register addresses, and the former engine receives the data concerning the drawing type, specifies the register addresses in accordance with the drawing type at the address generator, and then outputs the drawing parameters to the drawing engine in the defined sequence.

According to a second aspect of the present invention, there is provided a graphics drawing apparatus comprising a memory for storing drawing parameters, reading out the drawing parameters in a sequence according to an instruction of a read control signal, and transferring the same to a bus; a data transfer controller for receiving at least the data concerning the drawing type and outputting the read control signal for instructing to read out the drawing parameters to the memory in the sequence to be transferred defined in advance in accordance with the drawing type; a drawing engine having a plurality of drawing parameter registers corresponding to the drawing parameters, receiving specified drawing parameter register addresses and drawing parameter data transferred through the bus, setting drawing parameters corresponding to the address-specified drawing parameter registers, and drawing for the memory based on the set drawing parameters; and an address generator for receiving at least the data concerning the drawing type, generating the drawing parameter register addresses of the drawing engine in the sequence of the drawing parameters to be transferred defined in advance in accordance with the drawing type, and outputting the generated drawing parameter register addresses to the drawing engine.

In the second aspect of the present invention, preferably the address generator generates the drawing parameter register addresses based on register addresses specified via the bus.

In the second aspect of the present invention, preferably the data transfer controller is given a head address and an end address of the drawing in addition to the data concerning the drawing type.

According to a third aspect of the present invention, there is provided a graphics drawing apparatus comprising a memory for storing drawing parameters, reading out the drawing parameters in a sequence according to an instruction of a read control signal, and transferring the same to a bus; a data transfer controller for receiving at least the data concerning the drawing type and outputting the read control signal for instructing to read out the drawing parameters to the memory in the sequence to be transferred defined in advance in accordance with the drawing type; a drawing engine having a plurality of drawing parameter registers corresponding to the drawing parameters, receiving specified drawing parameter register addresses and drawing parameter data, setting drawing parameters corresponding to the address-specified drawing parameter registers, and drawing for the memory based on the set drawing parameters; an address generator for receiving at least data concerning the drawing type, generating drawing parameter register addresses of the drawing engine in the sequence of the drawing parameters to be transferred defined in advance in accordance with the drawing type, and outputting the generated drawing parameter register addresses to the drawing engine; a former engine for receiving at least the data concerning the drawing type and outputting the drawing parameters in the sequence to be transferred defined in advance in accordance with the drawing type; a data selector for selecting either of the drawing parameters transferred through the bus or the drawing parameters output by the former engine in accordance with an instruction, and inputting the same to the drawing engine; and a control circuit for controlling the selection of the data selector and controlling the supply of data concerning the drawing type to the address generator, the data transfer controller, and the former engine.

In the third aspect of the present invention, preferably the former engine receives the data concerning the drawing type, specifies the register address in accordance with the drawing type at the address generator, and then outputs the drawing parameters in the defined sequence; the address generator generates the drawing parameter register addresses based on the register addresses specified via the bus or the register addresses specified from the former engine; and the apparatus further comprises an address selector for selecting either of the register addresses transferred through the bus or the register addresses specified from the former engine in accordance with an instruction and inputting the same to the address generator; and the control circuit controls the selection of the address selector.

In the third aspect of the present invention, preferably the control circuit instructs the data selector to select the drawing parameters transferred through the bus when drawing by using the drawing data transferred from the memory and instructs the data selector to select the drawing parameters output from the former engine when drawing by using the drawing parameters from the former engine.

In the third aspect of the present invention, more preferably the control circuit instructs the data selector to select the drawing parameters transferred through the bus and instructs the address selector to generate the register addresses transferred through the bus when drawing by using the drawing data transferred from the memory and instructs the data selector to select the drawing parameters output from the former engine and instructs the address selector to select the register addresses by the former engine when drawing by using the drawing parameters from the former engine.

According to a fourth aspect of the present invention, there is provided a graphics drawing method for drawing for a memory based on drawing parameter data set in drawing parameter registers comprising transferring drawing parameters in the sequence to be transferred defined in advance in accordance with a drawing type, generating drawing parameter register addresses of a drawing engine in the sequence of the drawing parameters to be transferred defined in advance in accordance with the drawing type, receiving the generated drawing parameter register addresses and the transferred drawing parameter data, setting the drawing parameters corresponding to the address-specified drawing parameter registers, and drawing for the memory based on the set drawing parameters.

According to a fifth aspect of the present invention, there is provided a graphics drawing method for drawing for a memory based on drawing parameter data set in a drawing parameter register comprising reading drawing parameters from a memory in the sequence to be transferred defined in advance in accordance with a drawing type, transferring the drawing parameters in the read out sequence, generating drawing parameter register addresses of a drawing engine in the sequence of the drawing parameters to be transferred defined in advance in accordance with the drawing type, receiving the generated drawing parameter register addresses and the transferred drawing parameter data, setting the drawing parameters corresponding to the address-specified drawing parameter registers, and drawing for the memory based on the set drawing parameters.

According to a sixth aspect of the present invention, there is provided a graphics drawing apparatus for drawing graphics data comprising a drawing engine having a plurality of drawing parameter registers corresponding to drawing parameters, setting drawing parameters in drawing parameter registers specified by address data, and drawing based on the set drawing parameters; an address generator for generating the address data in a sequence preset in accordance with the drawing type and outputting the generated address data to the drawing engine; and a former engine for outputting the drawing parameters to the drawing engine in accordance with the sequence.

According to a seventh aspect of the present invention, there is provided a graphics drawing apparatus for drawing graphics data comprising a drawing engine having a plurality of drawing parameter registers corresponding to drawing parameters, setting drawing parameters in drawing parameter registers specified by address data, and drawing based on the set drawing parameters; an address generator for generating the address data of the drawing engine in a sequence preset in accordance with the drawing type and outputting the generated address data to the drawing engine; a memory for storing drawing parameters, reading out drawing parameters in accordance with an instruction of a read control signal, and transferring it to a path connected to the drawing engine; and a data transfer controller for outputting to the memory the read control signal instructing it to read out the drawing parameters in the sequence.

According to an eighth aspect of the present invention, there is provided a graphics drawing apparatus for drawing graphics data comprising a drawing engine having a plurality of drawing parameter registers corresponding to drawing parameters, setting drawing parameters in drawing parameter registers specified by address data, and drawing based on the set drawing parameters; an address generator for generating the address data of the drawing engine in a sequence preset in accordance with the drawing type and outputting the generated address data to the drawing engine; a memory for storing drawing parameters and reading out drawing parameters in accordance with an instruction of a read control signal; a data transfer controller for outputting to the memory the read control signal instructing it to read out the drawing parameters in the sequence; a former engine for outputting the drawing parameters to the drawing engine in accordance with the sequence; and a selector for selectively supplying to the drawing engine the drawing parameters read out from the memory and the drawing parameters output from the former engine.

According to the present invention, when drawing a graphic using drawing data supplied from the former engine, for example the control circuit switches the address selector and the data selector to the former engine side.

The control circuit also notifies the drawing type to the former engine and the address generator.

Next, the control circuit supplies the drawing parameters to the former engine in a sequence according to the specified drawing type.

The former engine outputs the register addresses to be specified in the address generator to the address selector.

The former engine also outputs the drawing parameters to the data selector in the sequence to be transferred defined in advance in accordance with the drawing type.

Then, the address selector selects the address data from the former engine and supplies it to the address generator according to an instruction of the control circuit.

The data selector selects the drawing parameter data from the former engine and supplies it to the drawing engine according to an instruction of the control circuit.

The address generator automatically generates the addresses of the drawing parameter registers required for the drawing provided in the drawing engine in the sequence of the drawing parameters defined in advance and supplies them to the drawing engine according to the addresses selected and supplied by the address selector and the specified drawing type.

The drawing engine receives as inputs the register addresses from the address generator and the drawing data from the former engine, sets the drawing parameters in the desired drawing parameter registers, and draws the graphic for the memory.

When drawing a graphic using drawing data transferred from the memory, for example, the control circuit notifies the head and end addresses of the drawing and the drawing type to the data transfer controller via the bus. The control circuit also notifies the drawing type to the address generator.

The address selector and the data selector are switched to the bus side based on the instruction of the control circuit.

The data transfer controller issues a read control signal to the memory for instructing it to read out the drawing parameters in a specified sequence according to the specified drawing type.

The memory for example transfers the drawing parameters to the bus in accordance with the read control signal from the data transfer controller.

The address selector selects the address data transferred through the bus and supplies it to the address generator according to an instruction of the control circuit.

The data selector selects the drawing data transferred through the bus and supplies it to the drawing engine according to an instruction of the control circuit.

The address generator automatically generates the addresses of the drawing parameter registers required for the drawing provided in the drawing engine in the defined sequence of the drawing parameters and supplies them to the drawing engine according to the addresses selected and supplied by the address selector and the specified drawing type.

The drawing engine receives as input the register addresses from the address generator and the drawing data from the former engine, sets the drawing parameters in the desired drawing parameter registers, and draws a graphic for the memory.

BRIEF DESCRIPTION OF THE DRAWINGS

These and other objects and features of the present invention will become clearer from the following description of the preferred embodiments given with reference to the attached drawings, wherein:

FIG. 6 is a view of a general example of drawing parameter settings;

FIG. 9 is a view of correspondence between types of drawing and a sequence of setting drawing parameters (registers) and a sequence of generation of drawing parameter register addresses;

FIG. 11 is a view for explaining types of attribute parameters for drawing a graphic;

FIG. 12 is a view for explaining various drawing types and functions combining attribute parameters when actually drawing a graphic;

FIGS. 13A to 13C are views for explaining a concrete example of graphics drawing in a case of one drawing type;

FIGS. 14A to 14C are views for explaining a concrete example of graphics drawing in a case of another drawing type;

FIGS. 16A and 16B are views of an example of data transfer when drawing a graphic using drawing data supplied from a former engine.

DESCRIPTION OF THE PREFERRED EMBODIMENTS

Preferred embodiments of the present invention will be described in detail below while referring to the attached figures.

Figure 1:
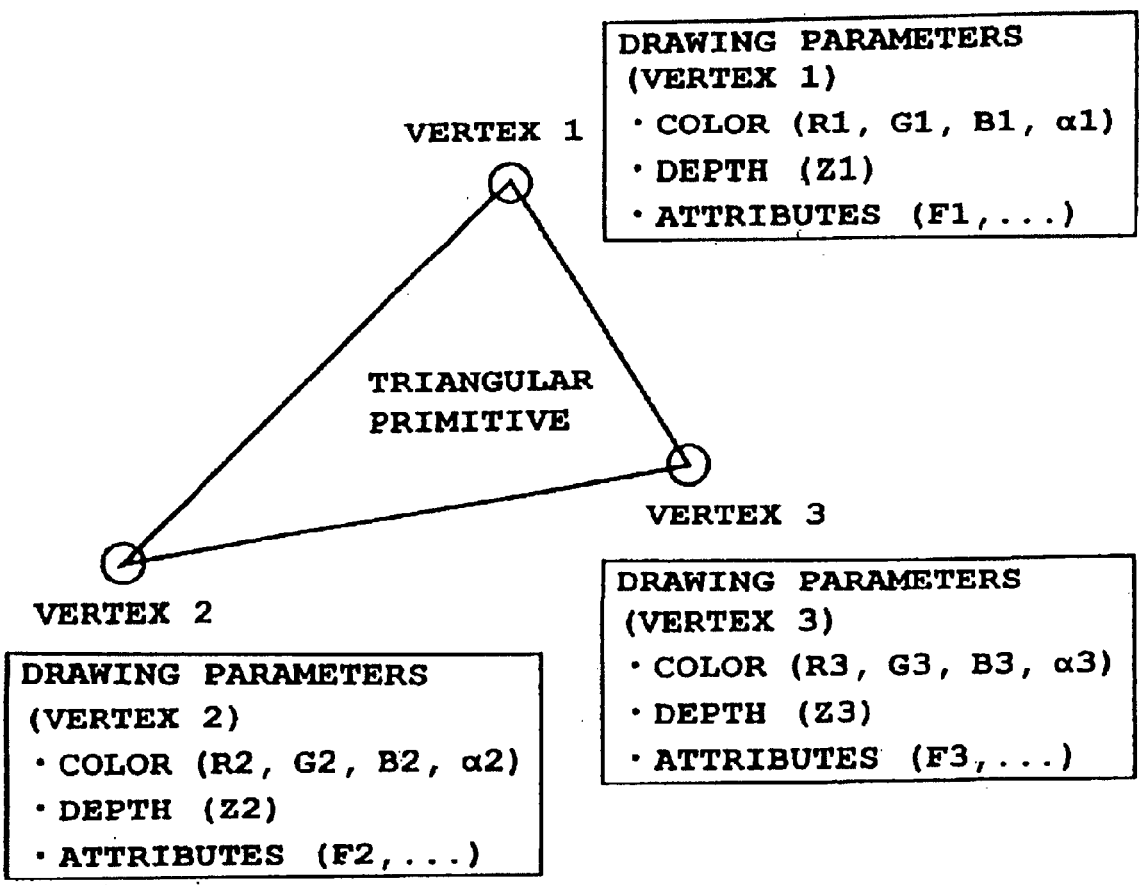
FIG. 1 is a view of an example of a drawing primitive and the drawing parameters where drawing a triangular primitive.
Figure 2:
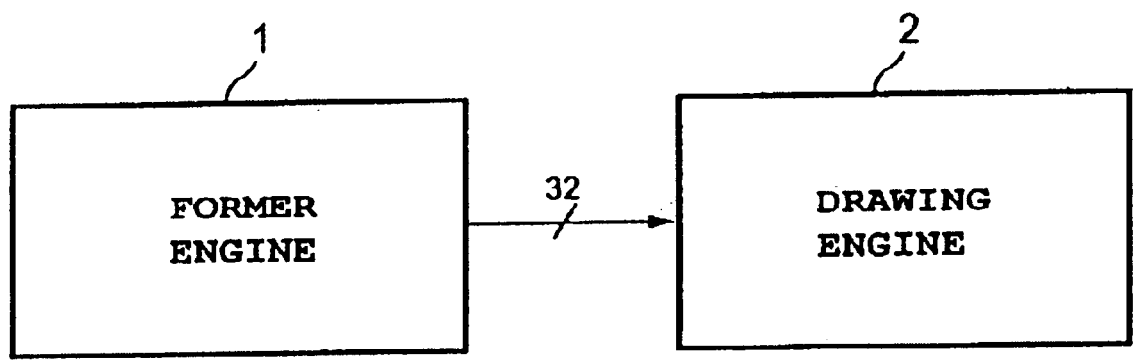
FIG. 2 is a view for explaining that the former engine and the drawing engine are connected by a finite bus size.
Figure 3:
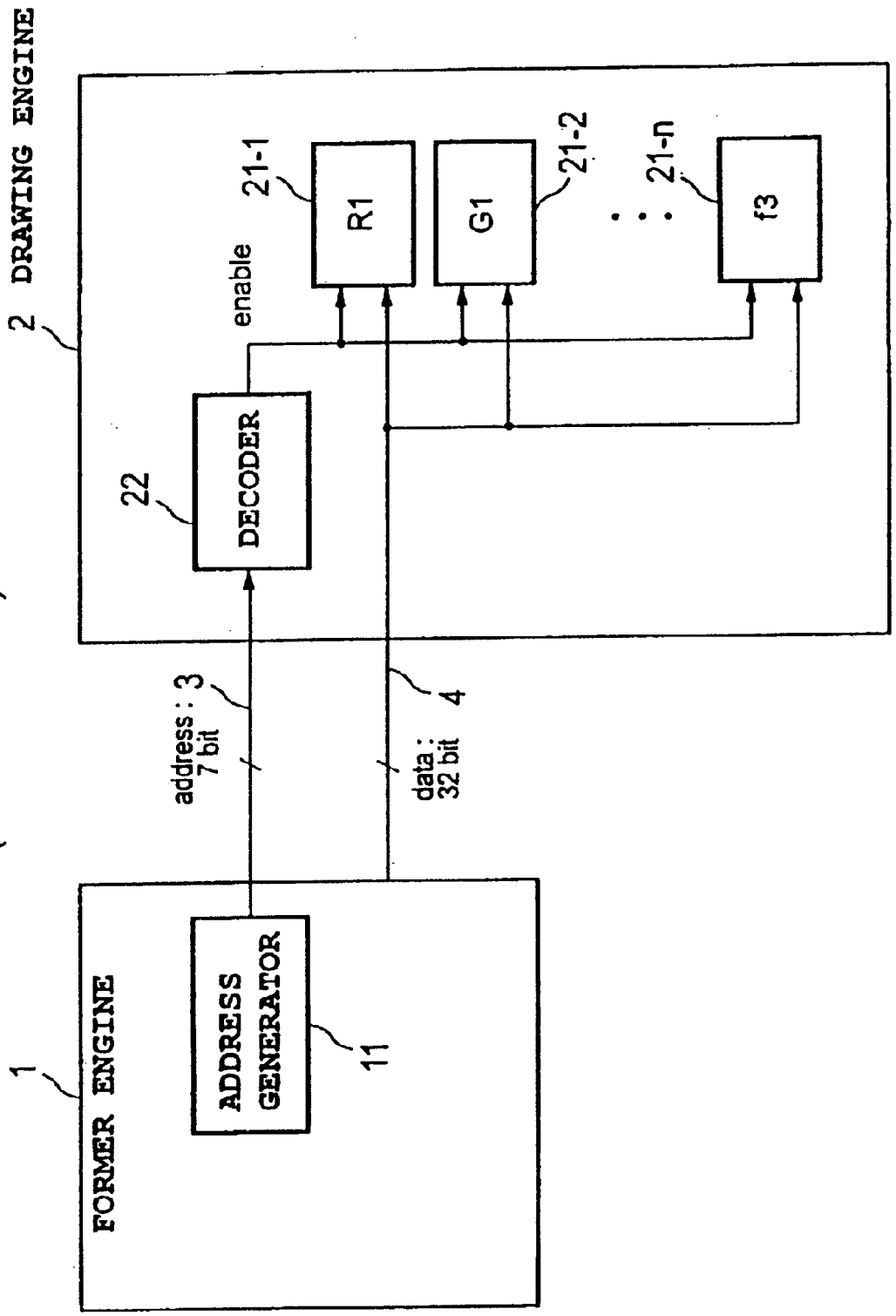
FIG. 3 is a block diagram of a concrete example of the configuration of a conventional former engine and drawing engine.
Figures 4, 5:
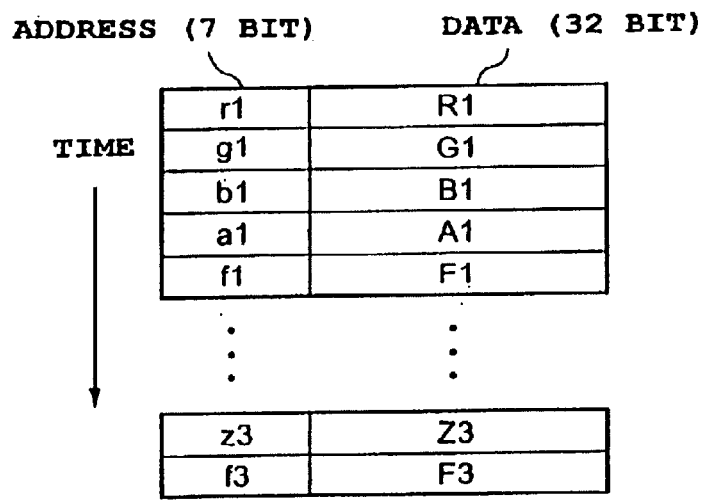
FIG. 4 is a view for explaining a data string from the former engine to the drawing engine.
FIG. 5 is a view of an example of drawing types and drawing parameters requiring setting.
Figure 7:
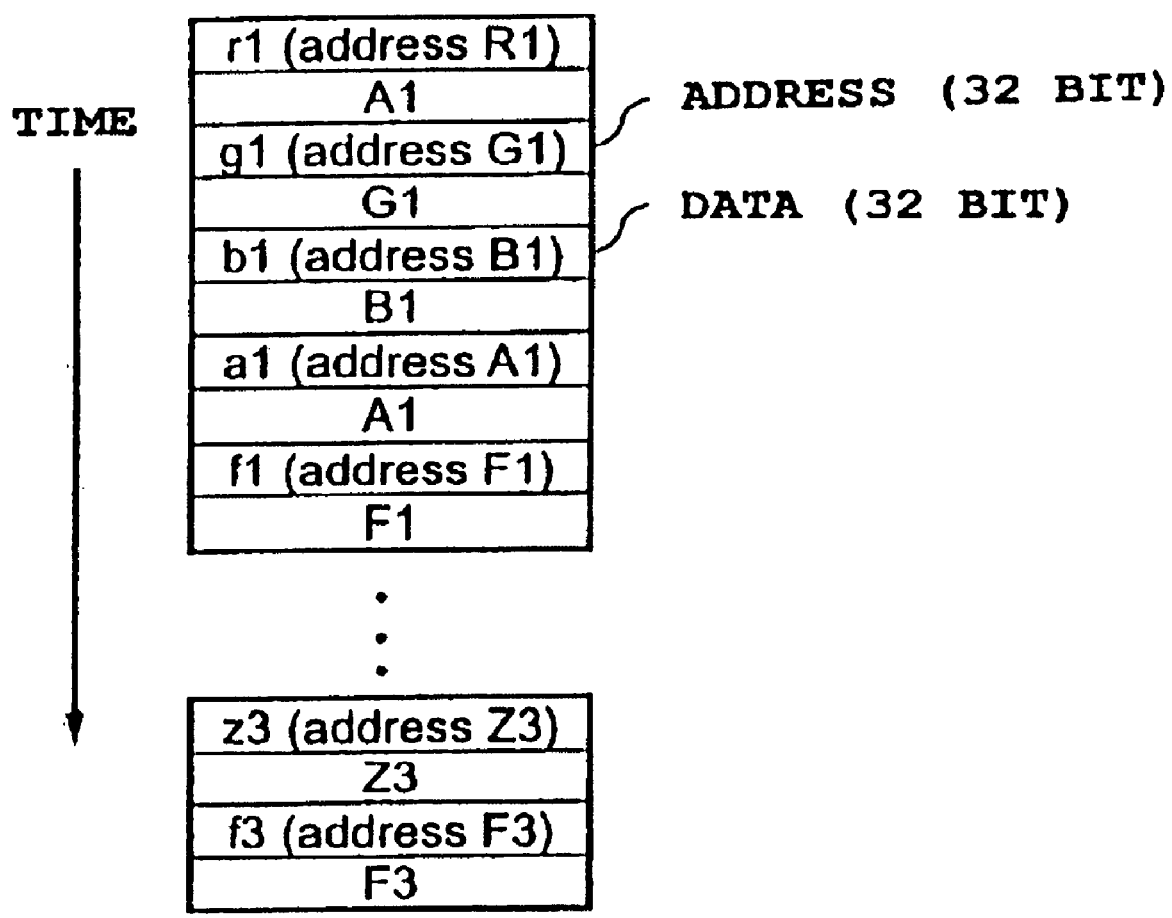
FIG. 7 is a view of an example of transfer of a DAM packet from the memory to the drawing engine.
Figure 8:
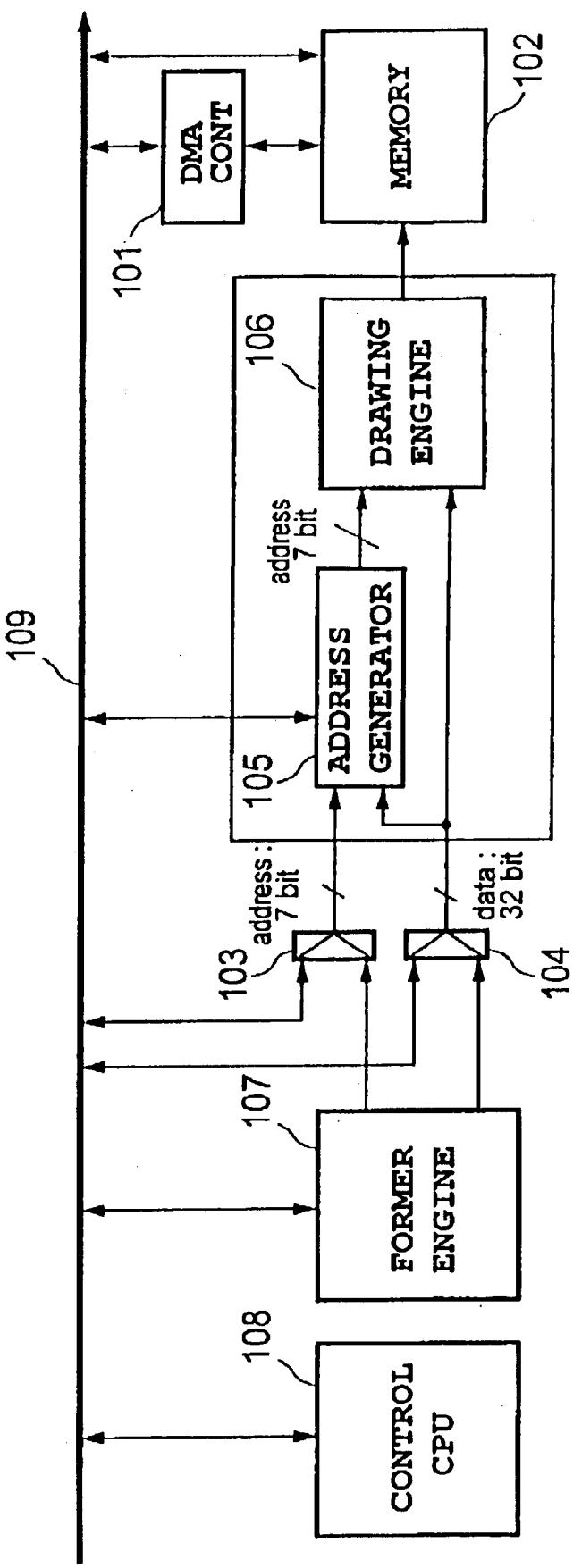
FIG. 8 is a block diagram of an embodiment of a graphics drawing apparatus according to the present invention.

FIG. 8 is a block diagram of an embodiment of a graphics drawing apparatus according to the present invention.

The graphics drawing apparatus 100 has, as shown in FIG. 8, a DMA controller (DMA CONT) 101 as the data transfer controller, a memory 102, a register address selector 103, a drawing data selector 104, an address generator 105, a drawing engine 106, a former engine 107, a control CPU 108 as the control circuit, and a general purpose bus 109.

When notified of the head and end addresses of drawing and the drawing type from the control CPU 108 via the general purpose bus 109, the DMA controller 101 issues to the memory 102 a drawing parameter read control signal instructing it to read out the drawing parameters in a defined sequence, for example, a sequence of R->G->B->A->X->Y->Z according to the specified drawing type.

The memory 102 is configured by for example a dynamic random access memory (DRAM), stores various drawing parameters, generates DMA packets of the drawing parameters in accordance with the read control signal from the DMA controller 101, and outputs the same to the general purpose bus 109.

The memory 102 is written drawing parameters etc. set by the drawing engine at predetermined addresses.

The register address selector 103 selects either of the 7-bit address data for specifying register addresses of the address generator 105 sent through the general purpose bus 109 or the 7-bit fixed addresses (register addresses) for specifying register addresses of the address generator 105 from the former engine 107 according to the instruction of the control CPU 108 and inputs the same to the address generator 105.

Specifically, when drawing a graphic using drawing parameter data (DMA packet) DMA transferred from the memory 102, the selector selects the addresses sent through the general purpose bus 109 and inputs them to the address generator 105.

On the other hand, when drawing a graphic using drawing parameter data supplied from the former engine 107, the selector selects the fixed addresses from the former engine 107 and inputs them to the address generator 105.

The drawing data selector 104 selects either of the drawing data sent through the general purpose bus 109 or the drawing data from the former engine 107 according to the instruction of the control CPU 108 and inputs the same to the drawing engine 106 and the address generator 105.

Specifically, when drawing a graphic using the drawing parameter data DMA transferred from the memory 102, the selector selects the drawing parameter data sent through the general purpose bus 109 and inputs it to the drawing engine 106 and the address generator 105.

On the other hand, when drawing a graphic using the drawing parameter data supplied from the former engine 107, the selector selects the drawing parameter data from the former engine 107 and inputs it to the drawing engine 106 and the address generator 105. The drawing data output from the drawing data selector 104 is usually used as the drawing parameter register data in the drawing engine 106. Even at the time of setting the drawing attributes of the address selector 105, the drawing data output from the drawing data selector 104 is used.

The address generator 105 automatically generates the addresses of the drawing parameter registers required for the drawing provided in the drawing engine 106 in the sequence of the drawing parameters to be transferred defined in advance according to the address data selected and supplied by the address selector 103 and the specified drawing type and supplies the generated addresses to the drawing engine 106.

FIG. 9 is a view of the correspondence between the drawing type and the sequence of setting the drawing parameters (registers) and the sequence of generation of the drawing parameter register addresses.

In FIG. 9, the capital letters show the drawing parameters, and small letters show the drawing parameter register addresses.

Specifically, R (red), G (green), and B (blue) designate the drawing parameters serving as the color information, A designates the drawing parameter serving as the α (alpha) blend coefficient, X, Y, and Z designate the drawing parameters serving as the position information, F designates the drawing parameter serving as the fog coefficient, and S, T, and Q designate the drawing parameters serving as the texture information.

Also, r designates the color information R register address, g designates the color information G register address, b designates the color information B register address, a designates the a blend coefficient register address, x designates the position information X register address, y designates the position information Y register address, z designates the position information Z register address, f designates the fog coefficient F register address, s designates the texture information S register address, t designates the texture information T register address, and u designates the texture information U register address.

As shown in FIG. 9, as the drawing type, there are "color", "color+fog", "texture mapping (T/M)", "color+T/M)", etc.

When the drawing type is "color", as shown in FIG. 9, the sequence of setting of the drawing parameters (registers) is defined as "R->G->B->A->X->Y->Z", and the drawing parameter register addresses are generated at the address generator 105 in the sequence of "r->g->b->a->x->y->z".

When the drawing type is "color+fog", as shown in FIG. 9, the sequence of setting of the drawing parameters (registers) is defined as "R->G->B->A->X->Y->Z->F" and the drawing parameter register addresses are generated at the address generator 105 in the sequence of "r->g->b->a->x->y->z->f".

When the drawing type is "texture mapping (T/M)", as shown in FIG. 9, the sequence of setting of the drawing parameters (registers) is defined as "S->T->Q->X->Y->Z", and the drawing parameter register addresses are generated at the address generator 105 in the sequence of "s->t->q->x->y->z".

Where the drawing type is "color+T/M", as shown in FIG. 9, the sequence of setting of the drawing parameters (registers) is defined as "S->T->Q->R->G->B->A->X->Y->Z", and the drawing parameter register addresses are generated at the address generator 105 in the sequence of "'s->t->q->r->g->b->a->x->y->z".

The drawing engine 106 sets the drawing parameters based on the register addresses from the register address generator 105 and the drawing data from the general purpose bus 109 or the drawing data from the former engine 107 selected by the drawing data selector 104.

Figure 10:
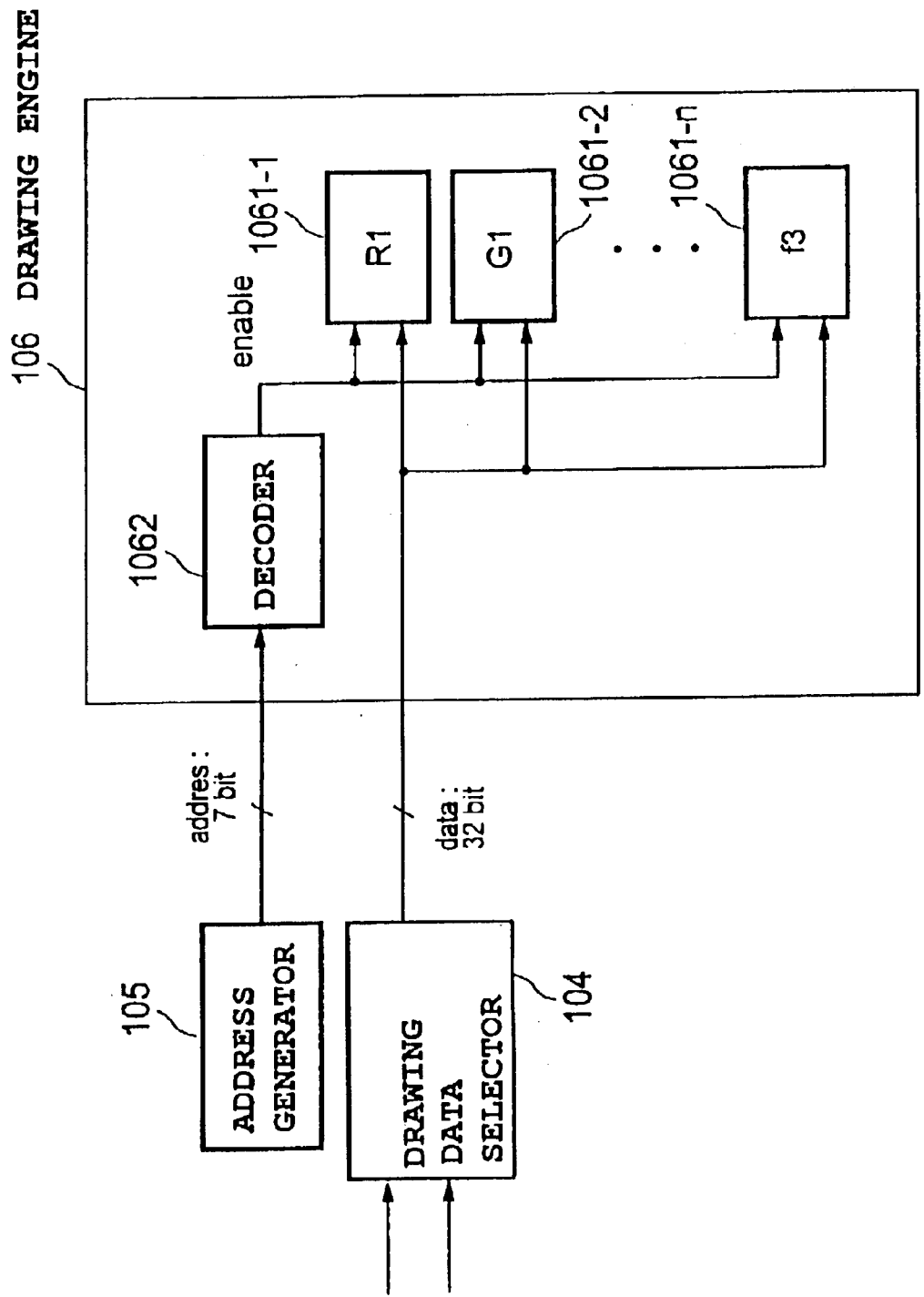
FIG. 10 is a view of an example of the configuration of a drawing engine according to an embodiment of the present invention.

The drawing engine 106 has, as shown in FIG. 10, drawing parameter registers 1061-1 (R1), 1061-2 (R2), ..., 1061-n (f3) and a decoder 1062 for decoding the register addresses from the register address generator 105.

FIG. 10 shows an example having a configuration corresponding to the case where the primitive to be drawn is a triangle.

In this case, the drawing parameters of the vertex 1 of the triangle include R (red) 1, G (green) 1, B (blue) 1 and α (alpha blend coefficient) 1 as the color information, include Z1 as the depth information, and include F (fog coefficient) 1 etc. as the attribute information; the drawing parameters of the vertex 2 include R2, G2, B2, and α2 as the color information, include Z2 as the depth information, and include F2 etc. as the attribute information; and the drawing parameters of the vertex 3 include R3, G3, B3, and α3 as the color information, include Z3 as the depth information, and include F3 etc. as the attribute information, so various types of drawing parameter registers are provided for every vertex.

The drawing engine 106 then sets the drawing parameters in the drawing parameter registers 1061-1 (R1), 1061-2 (G1), ..., 1061-n (f3).

When using the automatic address generation function of the address generator 105, the former engine 107 outputs fixed address data specifying address for the address generator 105 to the register address selector 103.

The former engine 107 outputs the drawing parameters supplied from the control CPU 108 to the drawing data selector 104 in the sequence defined in advance according to the drawing type specified via the general purpose control bus 109. In the case of normal drawing not using the automatic address generation function of the address generator 105, the former engine 107 outputs the addresses and data corresponding to the drawing registers into which the data is to be written. The address generator 105 does not automatically generate the drawing register addresses and outputs the input addresses as they are to the next stage.

The control CPU 108 instructs the address selector 103 to select either of the address data transferred through the general purpose bus 109 or the address data from the former engine 107 via the general purpose bus 109.

The control CPU 108 also instructs the data selector 104 to select either of the drawing parameter data transferred through the general purpose bus 109 or the drawing parameter data from the former engine 107.

Specifically, when drawing a graphic using the drawing parameter data DMA transferred from the memory 102, the control CPU 108 instructs the register address selector 103 to select the address data transferred through the general purpose bus 109 and instructs the drawing data selector 104 to select the drawing parameter data transferred through the general purpose bus 109.

On the other hand, when drawing a graphic using the drawing parameter data supplied from the former engine 107, the control CPU 108 instructs the register address selector 103 to select the address data from the former engine 107 and instructs the drawing data selector 104 to select the drawing parameter data from the former engine 107.

The control CPU 108 also notifies the head and end addresses of the drawing and the drawing type "CV" to the DMA controller 101 via the general purpose bus 109 when drawing a graphic using the drawing parameter data DMA transferred from the memory 102.

The control CPU 108 supplies the drawing parameters to the former engine 107 in the defined sequence according to the specified drawing type via the general purpose bus 109 when drawing a graphic using the drawing parameter data supplied from the former engine 107.

Below, an example of the types of the attribute parameters for drawing a graphic and various drawing types combining the attribute parameters when actually drawing a graphic in the graphics drawing apparatus according to the present embodiment will be explained step by step.

FIG. 11 is a view for explaining types and functions of the attribute parameters for drawing a graphic.

There are the following types of attribute parameters for drawing a graphic:

Color Information (C) Parameter

The color information (C) parameter specifies the color information of each vertex of a primitive.

Generally there are cases where the color information in the primitive is linearly interpolated (glow shading) by using the specified vertex colors and cases where it is painted by one certain color (flat shading).

In the primitive, the graphic is drawn in units of pixels by the specified color.

Fog Information (F) Parameter

The fog information (F) parameter specifies the fog information of each vertex of a primitive.

Generally there are cases where the fog information in the primitive is linearly interpolated (glow shading) by using the specified fog values and cases where it is represented by one certain color (flat shading).

Each pixel color changes to a white-like color in accordance with the magnitude of the fog value. The effect is as if seen through frosted glass.

Texture Information (S) Parameter

The texture information (S) parameter specifies the texture coordinate of each vertex of a primitive.

The texture coordinates in the primitive are generally linearly interpolated (glow shading).

At each pixel, the image value is read out from the texture memory according to the texture coordinate for the drawing of the pixel, that is, the texture mapping.

Texture mapping adheres part of a texture image to the primitive.

Vertex Coordinate (V) Parameter

The vertex coordinate (V) parameter specifies the geometric coordinate of each vertex of a primitive.

The texture coordinates in the primitive are linearly interpolated.

Texel Information (U) Parameter

The texel information (U) parameter specifies the texel coordinate of each vertex of a primitive.

The texel coordinates in the primitive are generally linearly interpolated (glow shading).

At each pixel, the image value is read out from the texture memory according to the texel coordinate for the drawing of the pixel, that is, the texture mapping.

Relationship Between Texture Coordinate (S) Parameter and Texel Coordinate (U) Parameter The texture memory is referred to using the texel coordinate.

A texture coordinate (s, t) is converted to a texel coordinate (u, v) as follows:

$$u=s/q*\text{USIZE}$$

$$v=t/q*\text{VSIZE}$$

Here, u is the texel coordinate x, v is the texel coordinate y, s is the texture coordinate x, t is the texture coordinate y, g is the texture coordinate w, USIZE is the texture memory x width (size), and VSIZE is the texture memory y width (size).

A texture coordinate is expressed by the homogeneous coordinate system of s, t, and q because this is convenient when expressing a perspective according to a perspective difference of a primitive placed far away.

FIG. 12 is a view for explaining various drawing types and functions combining the attribute parameters when actually drawing a graphic.

There are the following combinations of drawing types:

Drawing Type "CV"

In the drawing type "CV", in addition to the vertex coordinate, the color information of the primitive is specified. This is the minimum attribute information when drawing a primitive.

Drawing Type "CFV"

In the drawing type "CFV", in addition to the color information, the fog effect (overall whitening effect) is added.

With the drawing type "CFV", an effect of the entire screen gradually becoming white and fading out is obtained.

Drawing Type "SV"

In the drawing type "SV", in addition to the vertex coordinate, the texture coordinate is specified.

Part of the texture image is adhered to the primitive. It is possible to adhere an image prepared in advance by the user to the primitive.

Drawing Type "SCV"

In the drawing type "SCV", when drawing a single primitive, the adhesion of the texture image and the color drawing are superimposed. They are superimposed by a certain mixing rate.

For example, as shown in FIGS. 13A to 13C, when drawing light information or the like having gradation in the color drawing, shading can be added to the texture image in a simulated manner.

Drawing Type "SFV"

In the drawing type "SFV", in addition to the texture information, the fog effect (overall whitening effect) is added.

Drawing Type "SCFV"

In the drawing type "SCFV", in addition to the effects of the drawing type "SCV", the fog effect (overall whitening effect) is added.

Drawing Type "SSV"

In the drawing type "SSV", two texture images are superimposed on one primitive (multi-texture function).

Effects equivalent to those by the drawing type "SCV" are obtained, but the image further superimposed on the texture is the texture, so an expression more complex than the drawing type "SCV" becomes possible.

For example, as shown in FIGS. 14A to 14C, it is possible to express a complex shape of reflection etc. in a simulated manner.

Usually, multi-texture is realized by multi-rendering for further adding texture image to a once drawn texture image, but in the case of a rendering engine having a multi-texture function, simultaneous specification of two types of textures is possible.

Drawing Type "SSCV"

In the drawing type "SSCV", in addition to the drawing of the drawing type "SSV", color drawing is further added. Addition of shading etc. is also feasible.

Drawing Type "SSFV"

In the drawing type "SSFV", in addition to the drawing of the drawing type "SSV", the fog effect (overall whitening effect) is added.

Drawing Type "SSCFV"

In the drawing type "SSCFV", in addition to the drawing of the drawing type "SSCV", the fog effect (overall whitening effect) is added.

Note that, in addition to the above combinations, combinations of converting S (texture coordinate) to U (texel coordinate) are also possible.

Next, the operation according to the above configuration will be explained with reference to FIGS. 15A and 15B and FIGS. 16A and 16B.

Figures 15A, 15B:
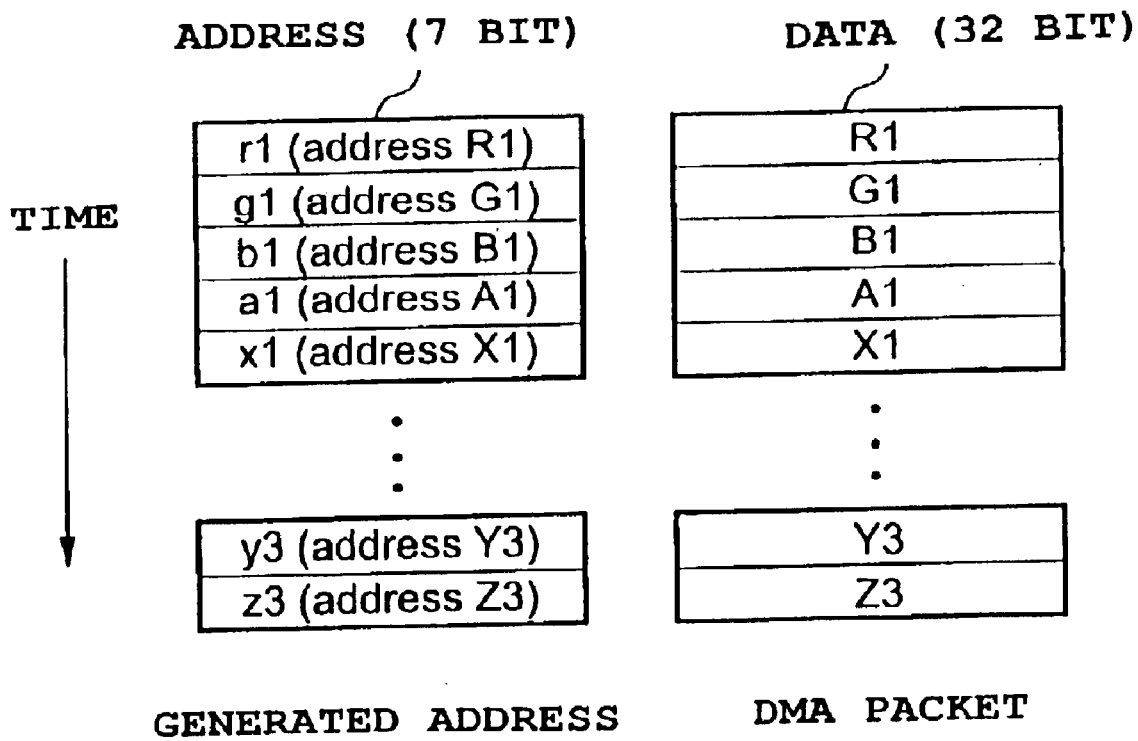
FIGS. 15A and 15B are views of an example of data transfer when drawing a graphic using drawing data transferred from the memory.

Note that, FIGS. 15A and 15B are views showing an example of data transfer when drawing a graphic using the drawing parameter data DMA transferred from the memory; while FIGS. 16A and 16B are views showing an example of data transfer when drawing a graphic using the drawing parameter data supplied from the former engine.

First, an explanation will be made of the case when drawing a graphic using the drawing parameter data DMA transferred from the memory.

First, the control CPU 108 notifies the DMA controller 101 of the head and end addresses of the drawing and the drawing type "CV" via the general purpose bus 109. The control CPU 108 also notifies the address generator 105 of the drawing type "CV".

The address selector 103 and the data selector 106 are switched to the general purpose bus 109 side under the instruction of the control CPU 108.

The DMA controller 101 issues to the memory 102 a drawing parameter read control signal instructing it to read out the drawing parameters in the sequence of R->G->B->A->X->Y->Z according to the specified drawing type "CV".

The memory 102 outputs 32-bit DMA packets of the drawing parameters as shown in FIG. 15A to the general purpose bus 109 in accordance with the read control signal from the DMA controller 101.

The register address selector 103 selects the address data transferred through the general purpose bus 109 and supplies it to the address generator 105 according to the instruction of the control CPU 108.

The drawing data selector 104 selects the drawing parameter data transferred through the general purpose bus 109 and supplies it to the drawing engine 106 and the address generator 105 according to the instruction of the control CPU 108.

The address generator 105 automatically generates the addresses of the drawing parameter registers required for the drawing provided in the drawing engine 106 in the sequence of the drawing parameters R->G->B->A->X->Y->Z defined in advance as shown in FIG. 15B and supplies them to the drawing engine 106 according to the addresses selected and supplied by the address selector 103 and the specified drawing type "CV".

Specifically, the drawing parameter register adresses are generated in the address generator 105 in the sequence of "r1->g1->b1->a1->x1->y1->z1->r2->g2->b2->a2->x2->y2->z2->r3->g3->b3->a3->x3->y3->z3".

The drawing engine 106 receives as input the register addresses from the register address generator 105 and the drawing data from the general purpose bus 109, sets the drawing parameters in the desired drawing parameter registers, and draws a graphic for the memory 102.

Next, an explanation will be given of a case of drawing a graphic using drawing parameter data supplied from the former engine.

First, the control CPU 108 switches the address selector 103 and the data selector 106 to the former engine 107 side via the general purpose bus 109.

The control CPU 108 also notifies the drawing type "CV" to the former engine 107 and the address generator 105.

Next, the control CPU 108 supplies the drawing parameters to the former engine 107 in the sequence of R->G->B->A->X->Y->Z via the general purpose bus 109 according to the specified drawing type "CV".

The former engine 107 outputs the fixed address data specifying addresses of the address generator 105, specifically the register address adr_gen of the address generator 105 as shown in FIG. 16A, to the register address selector 103.

The former engine 107 also outputs the 32-bit drawing parameter data R1 to Z3 as shown in FIG. 16A to the drawing data selector 104 based on the drawing parameters supplied from the control CPU 108 via the general purpose bus 109 according to the specified drawing type.

The register address selector 103 selects the address data from the former engine 107 and supplies it to the address generator 105 according to the instruction of the control CPU 108.

The drawing data selector 104 selects the drawing parameter data from the former engine 107 and supplies it to the drawing engine 106 according to the instruction of the control CPU 108.

The address generator 105 automatically generates the addresses of the drawing parameter registers required for the drawing provided in the drawing engine 106 in the sequence of the drawing parameters R->G->B->A->X->Y->Z defined in advance as shown in FIG. 16B and supplies them to the drawing engine 106 according to the specified drawing type "CV".

Specifically, the drawing parameter register addresses are generated in the address generator 105 in the sequence of "r1->g1->b1->a1->x1->y1->z1->r2->g2->b2->a2->x2->y2->z2->r3->g3->b3->a3->x3->y3->z3".

The drawing engine 106 receives as input the register addresses from the register address generator 105 and the drawing data from the former engine 107, sets the drawing parameters in the desired drawing parameter registers, and draws a graphic for the memory 102.

As explained above, according to the present embodiment, since provision is made of a DMA controller 101 for outputting a drawing parameter read control signal for instructing read out of drawing parameters in a defined sequence according to a specified drawing type when notified of the head and end addresses and the drawing type from a control CPU 108 via a general purpose bus 109; a memory 102 for storing various types of drawing parameters, generating DMA packets of the drawing parameters in accordance with the read control signal from the DMA controller 101, and outputting the same to the general purpose bus 109; an address generator 105 for automatically generating addresses of the drawing parameter registers required for the drawing provided in the drawing engine 106 in the sequence of the drawing parameters defined in advance according to the supplied address data and the specified drawing type; a former engine 107 for outputting register addresses specifying addresses of the address generator 105 and outputting drawing parameters in a defined sequence according to the specified drawing type; a register address selector 103 for selecting either of the 7-bit address data for specifying register addresses of the address generator 105 transferred through the general purpose bus 109 or 7-bit fixed addresses for specifying register addresses of the address generator 105 from the former engine 107 according to the instruction of the control CPU 108 and inputting the same to the address generator 105; and a drawing data selector 104 for selecting either of the drawing parameter data transferred through the general purpose bus 109 or the drawing parameter data from the former engine 107 according to the instruction of the control CPU 108 and inputting the same to the drawing engine 106 and the address generator 105, the following effects can be obtained.

Namely, according to the present embodiment, by the definition of the sequence of input of the drawing parameters and the automatic generation of the drawing parameter register addresses, it becomes unnecessary to expand the addresses at the time of data transfer (DMA transfer in the example) and the amount of data transferred is substantially halved. Due to the reduction of the amount of data transferred, improvement of the performances of the system as a whole can be expected.

Also, the former engine, the DMA controller, etc. no longer have to consider the system-dependent drawing parameter register addresses, so the general applicability of the drawing engine is improved.

Also, the former engine, the DMA controller, etc. no longer have to generate the system-dependent drawing parameter register addresses, so it becomes possible to reduce the circuit size of the former engine, DMA controller, etc. and lower the power consumption.

Further, the drawing parameters required for the drawing are general to a certain extent and can be defined according to the drawing type (texture mapping, fog blending, alpha blending, etc.). By generalizing the sequence of input of the drawing parameters, data precision, etc., it becomes possible to propose new formats in the drawing of primitives.

By the reduction of the amount of data transferred, a reduction of the power consumption can be realized.

While the invention has been described with reference to specific embodiments chosen for purpose of illustration, it should be apparent that numerous modifications could be made thereto by those skilled in the art without departing from the basic concept and scope of the invention.

What is claimed is:

1. A graphics drawing apparatus comprising:

a memory for storing drawing parameters, reading out the drawing parameters in a sequence according to an instruction of a read control signal, and transferring the drawing parameters to a bus;

a data transfer controller for receiving at least data concerning a drawing type and outputting the read control signal for instructing to read out the drawing parameters from the memory in a sequence to be transferred defined in advance in accordance with the drawing type;

a drawing engine having a plurality of drawing parameter registers corresponding to the drawing parameters, receiving specified drawing parameter register addresses and drawing parameter data, setting drawing parameters corresponding to the specified drawing parameter register addresses, and drawing a graphic for the memory based on the set drawing parameters;

an address generator for receiving at least data concerning the drawing type, generating drawing parameter register addresses of the drawing engine in the sequence of the drawing parameters to be transferred defined in advance in accordance with the drawing type, and outputting the generated drawing parameter register addresses to the drawing engine;

a former engine for receiving at least the data concerning the drawing type and outputting the drawing parameters in the sequence to be transferred defined in advance in accordance with the drawing type;

a data selector for selecting either of the drawing parameters transferred through the bus or the drawing parameters output by the former engine in accordance with an instruction, and inputting the same to the drawing engine; and a control circuit for controlling the selection of the drawing parameters and controlling the supply of data concerning the drawing type to the address generator, the data transfer controller, and the former engine.

2. A graphics drawing apparatus as set forth in claim 1, wherein:

the former engine receives the data concerning the drawing type, specifies a register address in accordance with the drawing type, and then outputs the drawing parameters in the defined sequence;

the address generator generates the drawing parameter register addresses based on register addresses specified via the bus or the register addresses specified from the former engine;

the apparatus further comprises an address selector for selecting either of the register addresses transferred through the bus or the register addresses specified from the former engine in accordance with an instruction and inputting the same to the address generator; and the control circuit controls the selection of the address selector.

3. A graphics drawing apparatus as set forth in claim 1, wherein the control circuit instructs the data selector to select the drawing parameters transferred through the bus when drawing by using the drawing data transferred from the memory and instructs the data selector to select the drawing parameters output from the former engine when drawing by using the drawing parameters from the former engine.

4. A graphics drawing apparatus as set forth in claim 1, wherein:

the control circuit instructs the data selector to select the drawing parameters transferred through the bus and instructs the address generator to generate the register addresses transferred through the bus when drawing by using the drawing data transferred from the memory, and the control circuit instructs the data selector to select the drawing parameters output from the former engine and instructs the address selector to select the register addresses as a function of the drawing parameters from the former engine.

5. A graphics drawing apparatus as set forth in claim 1, wherein the data transfer controller is given a head address and an end address of the drawing in addition to the data concerning the drawing type.

* * * * *